United States Patent [19]
Kawabata

[11] Patent Number: 6,045,223
[45] Date of Patent: Apr. 4, 2000

[54] NOSE PAD DEVICE FOR GLASSES

[75] Inventor: Hiroyuki Kawabata, Fukui, Japan

[73] Assignee: Sasamata Co., Ltd., Fukui, Japan

[21] Appl. No.: 09/228,395

[22] Filed: Jan. 12, 1999

[30]     Foreign Application Priority Data

Aug. 26, 1998   [JP]   Japan .................................. 10-257566

[51] Int. Cl.[7] .................................................... G02C 5/12
[52] U.S. Cl. .......................................... 351/137; 351/136
[58] Field of Search .................................. 351/136, 137,
                    351/138, 139, 78, 79, 80, 81, 41

[56]              References Cited
              U.S. PATENT DOCUMENTS 4,500,179   2/1985   Schonhut ................................ 351/137
   4,896,957   1/1990   Speer ...................................... 351/137
   5,694,194  12/1997   Morrison ................................ 351/137

*Primary Examiner*—Hung Xuan Dang
*Attorney, Agent, or Firm*—Sughrue, Mion, Zinn, Macpeak & Seas, PLLC

[57]                    ABSTRACT

A nose pad device constituting glasses for the far-sighted and the near-sighted is constructed of a nose pad and a connection member installed on the nose pad. Upper and lower ends of a vertically extending supporting member are connected with each of upper and lower positions of the rear surface of the pad body. The connection member has an insertion hole through which the supporting member is inserted and slides vertically along the supporting member. The connection member is held at an upper position and a lower position of the supporting member.

11 Claims, 22 Drawing Sheets

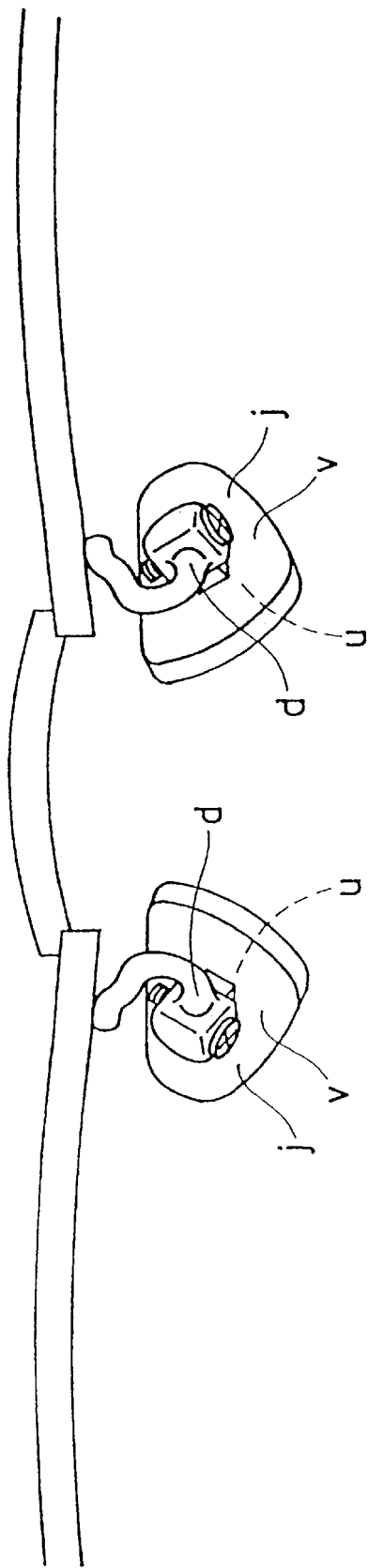

NOSE PAD DEVICE FOR GLASSES

BACKGROUND OF THE INVENTION

1. Field of the Invention

Generally, the present invention relates to a nose pad device for glasses and more particularly, to a nose pad device for glasses preferably used to allow glasses for both the far-sighted and the near-sighted to be easily put on the bridge of the nose.

2. Description of the Related Art

To overcome inconvenience of carrying glasses for the near-sighted and glasses for the far-sighted, glasses for both the far-sighted and the near-sighted are widely used in which the upper part of the lens is used for the near-sighted and the lower part thereof is used for the far-sighted.

This kind of glasses for both the far-sighted and the near-sighted necessitates a user's visual axis to be switched from an upward direction to a downward direction or vice versa, thus causing the user to feel troublesome in using them.

A user who feels it inconvenient to switch the visual axis changes the position of nose pads along the bridge of the nose to move the lens frame of the glasses upward or downward so that the user can easily see an object through the upper part or lower part of the lens. But it is troublesome to move the front frame of the glasses upward or downward.

In order to solve the above-described problem, glasses (b) for both the far-sighted and the near-sighted provided with a nose pad device (a) as shown in FIGS. 17 and 18 have been proposed.

A long iron piece (f) vertically extending is mounted on a pad connection portion (e) connected with a box (d1) forming a front end portion (d) of an arm (c) fixed to the inner edge of a lens. An iron piece-incorporating portion (g) is positioned inside a vertically extending sliding groove (k) formed on the rear surface of a pad body (j) which contacts the bridge of the nose such that the iron piece-incorporating portion (g) is movable vertically along the sliding groove (k). The iron piece (f) is attracted to a magnet (m) provided at the upper end of the sliding groove (k) to connect the pad body (j) with the front end (d) of the arm (c) at an upper position p1 (FIG. 17). The iron piece (f) is also attracted to a magnet (n) provided at the lower end of the sliding groove (k) to connect the pad body (j) with the front end (d) of the arm (c) at a lower position p2 (FIG. 18).

FIGS. 17 and 19 show the upper position p1 at which the iron piece (f) has been attracted to the magnet (m). At the upper position p1, the position of each of the right and left lenses (q) and (q) relative to each of the right and left pad bodies (j) and (j) becomes high. Thus, as shown by an arrow of FIG. 19, a user can see an object easily through a part (r) for the far-sighted with the forward-facing visual axis.

When the iron piece (f) is attracted to the magnet (n) as shown in FIGS. 18 and 20, the pad body (j) is held at the lower position p2. At the lower position p2, the position of each of the right and left lenses (q) and (q) relative to each of the right and left pad bodies (j) and (j) becomes low. Thus, as shown by an arrow of FIG. 20, a user can see an object easily through a part (s) for the near-sighted with the forward-facing visual axis.

According to the above-described improved glasses for both the far-sighted and the near-sighted, the position of connection between the pad body (j) and the front end portion (d) of the arm (c) is switched between the upper position p1 and the lower position p2 to allow the glasses for both the far-sighted and the near-sighted to be used easily and correctly as the glasses for the far-sighted and the glasses for the near-sighted with the forward-facing visual axis. Thus, the user feels that above-described glasses for both the far-sighted and the near-sighted is more usable than the conventional glasses for both the far-sighted and the near-sighted which necessitate the visual axis to be switched from the upward direction to the downward direction or vice versa.

However, the nose pad device (a) having the above-described construction has the following problems:

① The sliding groove (k) for sliding the iron piece-incorporating portion (g) vertically thereon is formed on the rear surface of the pad body. Thus, as shown in FIGS. 19 and 20, a groove-forming projection (t) (FIG. 17) vertically extending and having a thickness about 1.5 times as large as the thickness of the nose pad projects from the rear surface of the nose pad, thus being so conspicuous for the eyes that it causes the glasses to look unattractive.

② Further, as shown in FIG. 21, the distance between the front end (d) of the arm (c) and the front surface (u) of the nose pad is longer by the thickness of the groove-forming projection (t) than the distance between the front end (d) of the arm (c) and the front surface (u) of the conventional nose pad whose rear surface (v) is very close to the front end (d). Therefore, the above-described glasses for both the far-sighted and the near-sighted comprising nose pad device (a) has a problem that it is difficult for the user to adjust a focusing operation and thus, it is difficult to accomplish eyesight correction accurately.

③ Further, the sliding groove (k) is formed integrally with the rear surface of the pad body (j). Thus, the sliding groove (k) is seen through from the front side of the pad body, thus causing the glasses to look unattractive.

SUMMARY OF THE INVENTION

It is an object of the present invention to provide a nose pad device for glasses capable of solving the above-described problem.

In order to solve the problems, the following means are adopted by the present invention.

That is, a nose pad device for glasses of the present invention comprises a nose pad having a supporting member provided rearward from a rear surface of a pad body contacting the bridge of the nose, with upper and lower ends of the supporting member connected with each of upper and lower positions of the rear surface of the pad body and having an engaging bulged portion formed on the supporting member on both side edges or one side edge of a center part thereof in a vertical direction thereof; and a connection member having an insertion hole through which the supporting member is inserted and sliding vertically along the supporting member. When the connection member is located at the center part of the supporting member, a surface defining the insertion hole engages the engaging bulged portion so as to keep the connection member at the center part of the supporting member. When the connection member is located at an upper part of the supporting member, a lower end of the insertion hole contacts and engages an upper portion of the engaging bulged portion so as to prevent the connection member from moving downward relative to the supporting member. When the connection member is located at a lower part of the supporting member, an upper end of the insertion hole contacts and engages a lower portion of the engaging bulged portion so as to prevent the connection member from moving upward relative to the supporting member.

Preferably, in the nose pad device for glasses, an end of each of mating plates at one side thereof is flexibly continuous with each other to form the connection member; and an engaging groove engaging the engaging bulged portion of the supporting member is formed at the other side of an inner surface of each of the mating plates so that an insertion hole through which the supporting member is inserted is formed of the engaging grooves by combining the mating plates with each other, with the insertion grooves facing each other.

In this case, preferably, a width of each of the upper and lower ends of the insertion hole expand elastically when the upper and lower ends pass the engaging bulged portion and is restored elastically after the upper and lower ends pass therethrough.

According to another aspect of the present invention, a nose pad device for glasses comprises a nose pad having a supporting member provided rearward from a rear surface of a pad body contacting the bridge of the nose, with upper and lower ends of the supporting member connected with each of upper and lower positions of the rear surface of the pad body and having an engaging projection portion formed on the supporting member at a center part, an upper part, and a lower part thereof in a lengthwise direction thereof; and a connection member having an insertion hole through which the supporting member is inserted and sliding vertically along the supporting member. When the connection member is located at the center part of the supporting member, an engaging concave portion formed on a surface defining the insertion hole engages the engaging projection portion formed at the center part so as to keep the connection member at the center part of the supporting member. When the connection member is located at the upper part of the supporting member, the engaging concave portion engages the engaging projection portion formed at the upper part so as to keep the connection member at the upper part of the supporting member. When the connection member is located at the lower part of the supporting member, the engaging concave portion engages the engaging projection portion formed at the lower part so as to keep the connection member at the lower part of the supporting member.

According to still another aspect of the present invention, a nose pad device for glasses comprises a nose pad having a supporting member provided rearward from a rear surface of a pad body contacting the bridge of the nose, with upper and lower ends of the supporting member connected with each of upper and lower positions of the rear surface of the pad body and having an engaging bulged portion formed on the supporting member on both side edges or one side edge of a center part thereof in a vertical direction thereof; and a connection member having an insertion hole through which the supporting member is inserted and sliding vertically along the supporting member. When the connection member is located at an upper part of the supporting member, a lower end of the insertion hole contacts and engages an upper portion of the engaging bulged portion so as to prevent the connection member from moving downward relative to the supporting member. When the connection member is located at a lower part of the supporting member, an upper end of the insertion hole contacts and engages a lower portion of the engaging bulged portion so as to prevent the connection member from moving upward relative to the supporting member.

According to further aspect of the present invention, a nose pad device for glasses comprises a nose pad having a supporting member provided rearward from a rear surface of a pad body contacting the bridge of the nose, with upper and lower ends of the supporting member connected with each of upper and lower positions of the rear surface of the pad body and having an engaging projection portion formed on the supporting member at an upper part and a lower part thereof in a lengthwise direction thereof; and a connection member having an insertion hole through which the supporting member is inserted and sliding vertically along the supporting member. When the connection member is located at the upper part of the supporting member, the engaging concave portion formed on a surface defining the insertion hole engages the engaging projection portion formed at the upper part so as to keep the connection member at the upper part of the supporting member. When the connection member is located at the lower part of the supporting member, the engaging concave portion engages the engaging projection portion formed at the lower part so as to keep the connection member at the lower part of the supporting member.

Preferably, in the nose pad device for glasses, the connection member does not contact the rear surface of the pad body when the connection member slides vertically.

Preferably, the engaging bulged portion has an edge gently curved in the shape of a circular arc, and both ends of the engaging bulged portion is continuous with each of an edge of an upper part of the supporting member and an edge of a lower part thereof through an edge curved concavely in the shape of a circular arc.

Preferably, the pad body is transparent, and displays such as characters or figures are formed on a surface, of the connection member, confronting the rear surface of the pad body.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 22 is a plan view showing ordinary glasses.

DETAILED DESCRIPTION OF THE PREFERRED EMBODIMENTS

The embodiments of the present invention will be described below with reference to the drawings.

First Embodiment

A nose pad device 1 for glasses (hereinafter referred to as merely nose pad device) according to the present invention comprises a nose pad 2 made of synthetic resin such as nylon shaped by one-piece molding and a connection member 3 installed on the nose pad 2.

Figure 2:
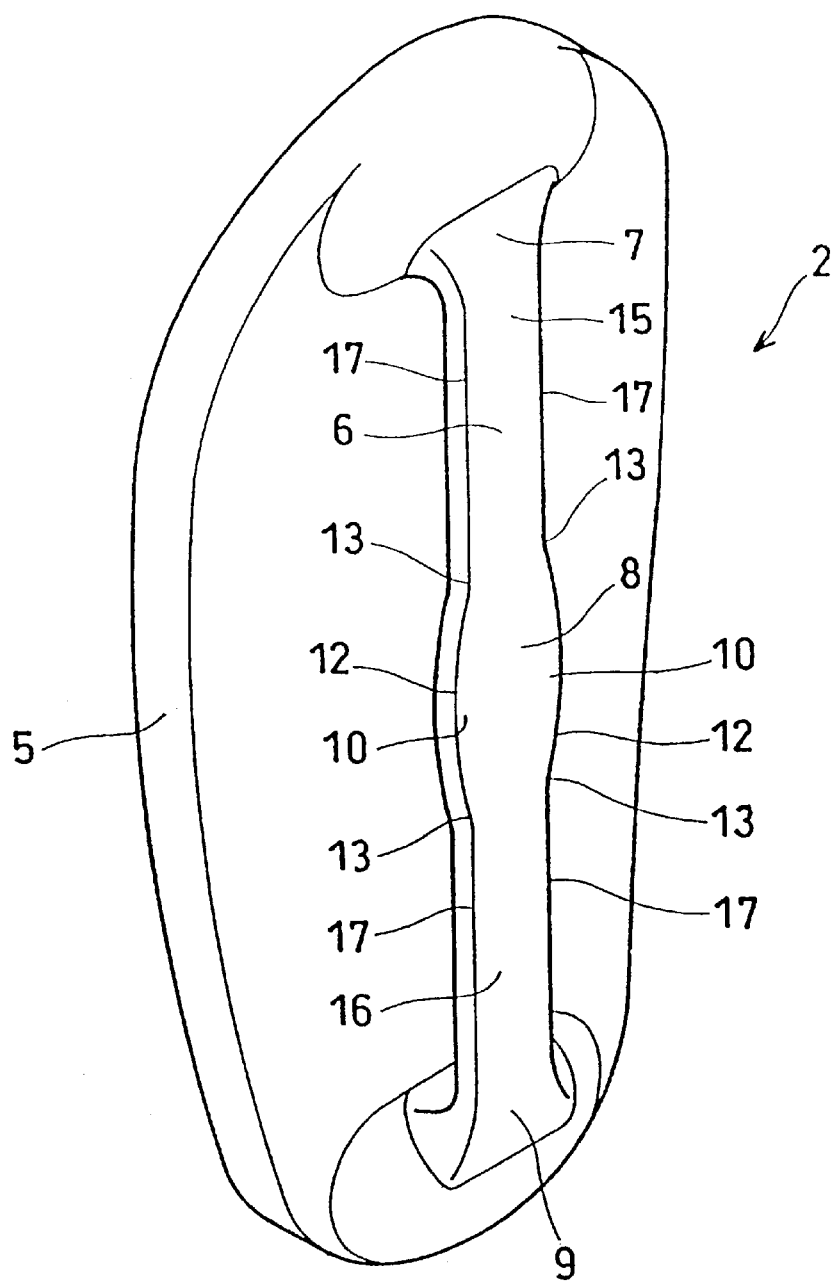
FIG. 2 is a perspective view showing a nose pad.

As shown in FIG. 2, in the nose pad 2, an upper end 7 and a lower end 9 of a substantially straight supporting member 6 extending vertically are connected with an upper position and a lower position of the rear surface of a pad body 5 which contacts the bridge of the nose. The supporting member 6 is long and flat in the right-to-left direction in cross section. Right and left side edges of a center part 8 of the supporting member 6 in the vertical direction thereof project in the same extent in the right and left directions of the pad body 5, thus forming right and left engaging bulged portions 10 and 10.

Each of the right and left engaging bulged portions 10 and 10 has an edge 12 gently curved in the shape of a circular arc. The upper and lower end of each of the right and left engaging bulged portions 10 and 10 in the vertical direction of the supporting member 6 is continuous with each of an edge 17 of a narrow upper part 15 of the supporting member 6 and an edge 17 of a narrow lower part 16 thereof through an edge 13 curved concavely in the shape of a circular arc.

Figure 1:
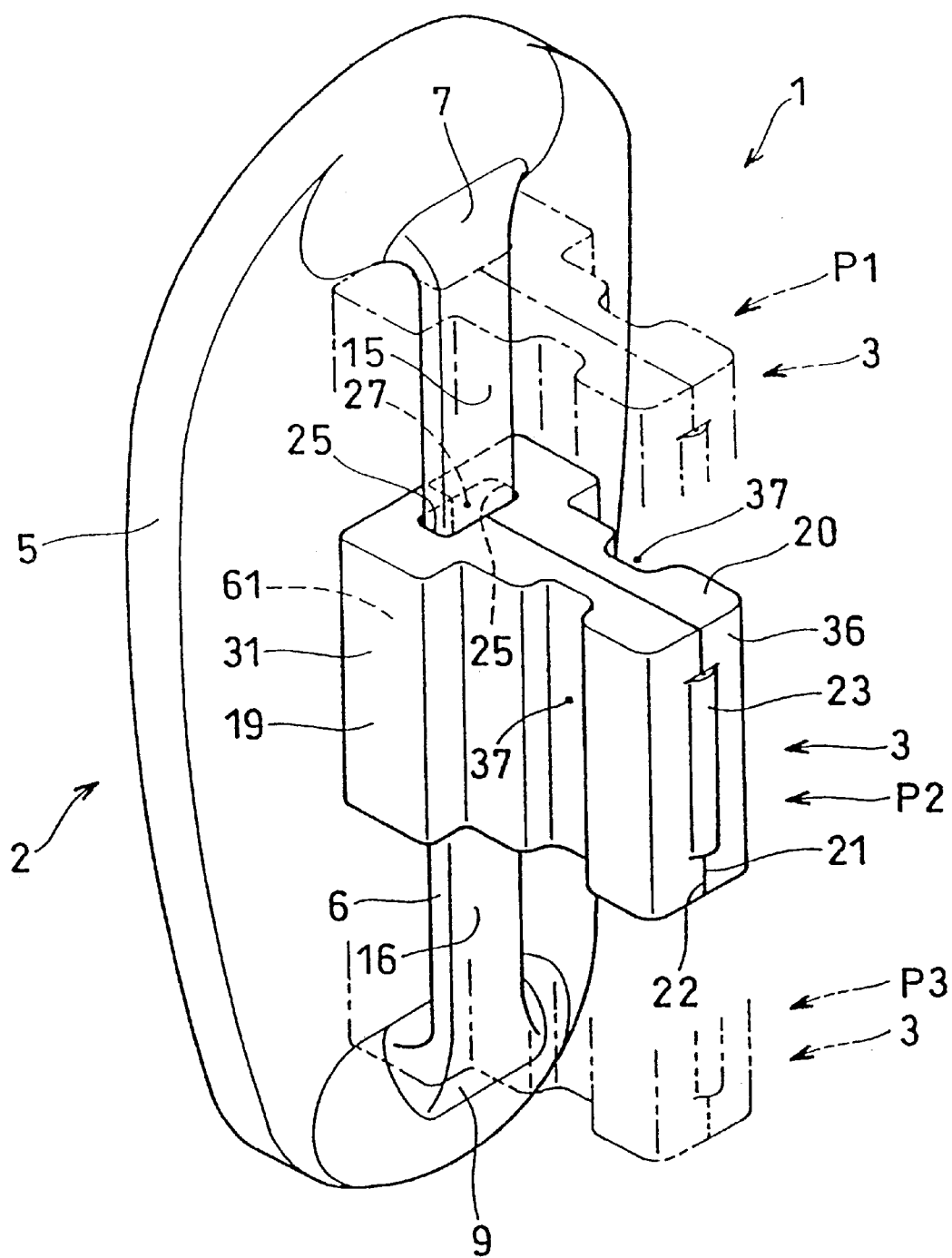
FIG. 1 is a perspective view showing a nose pad device according to a first embodiment of the present invention.
Figure 3:
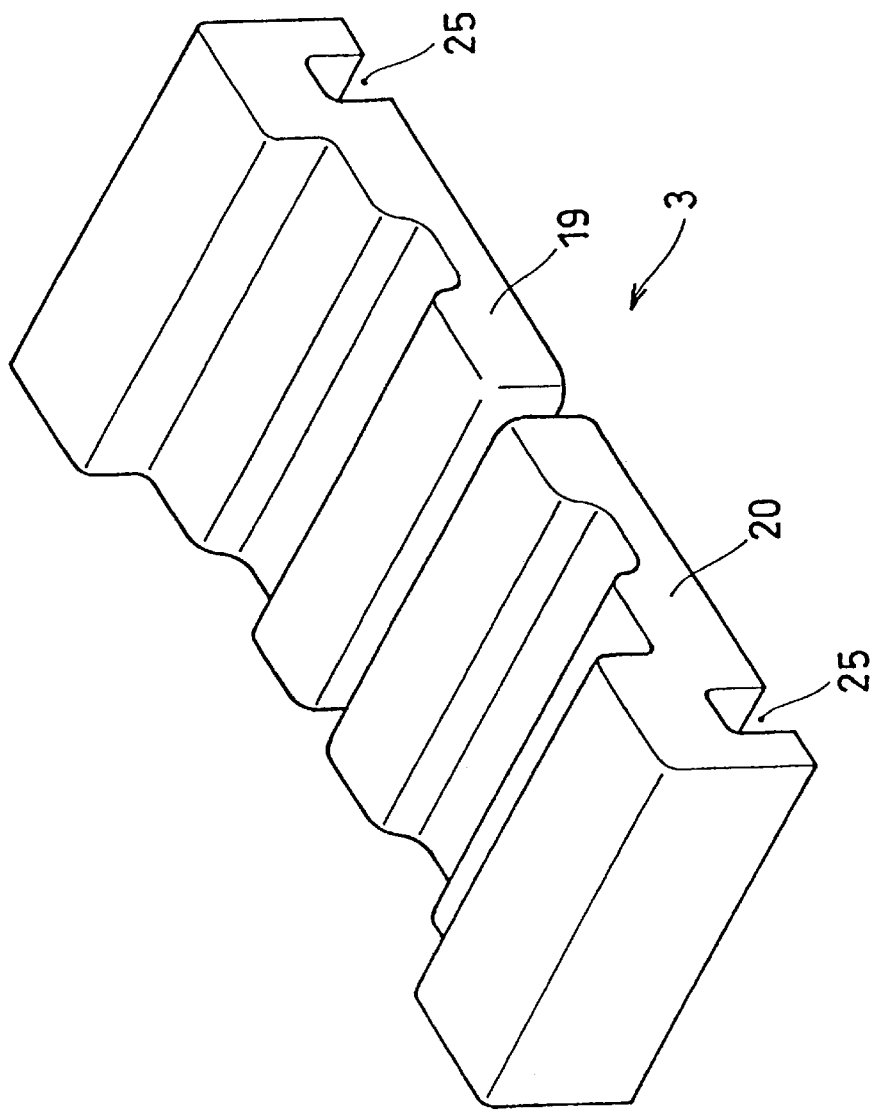
FIG. 3 is a perspective view showing a developed connection member.
Figure 4:
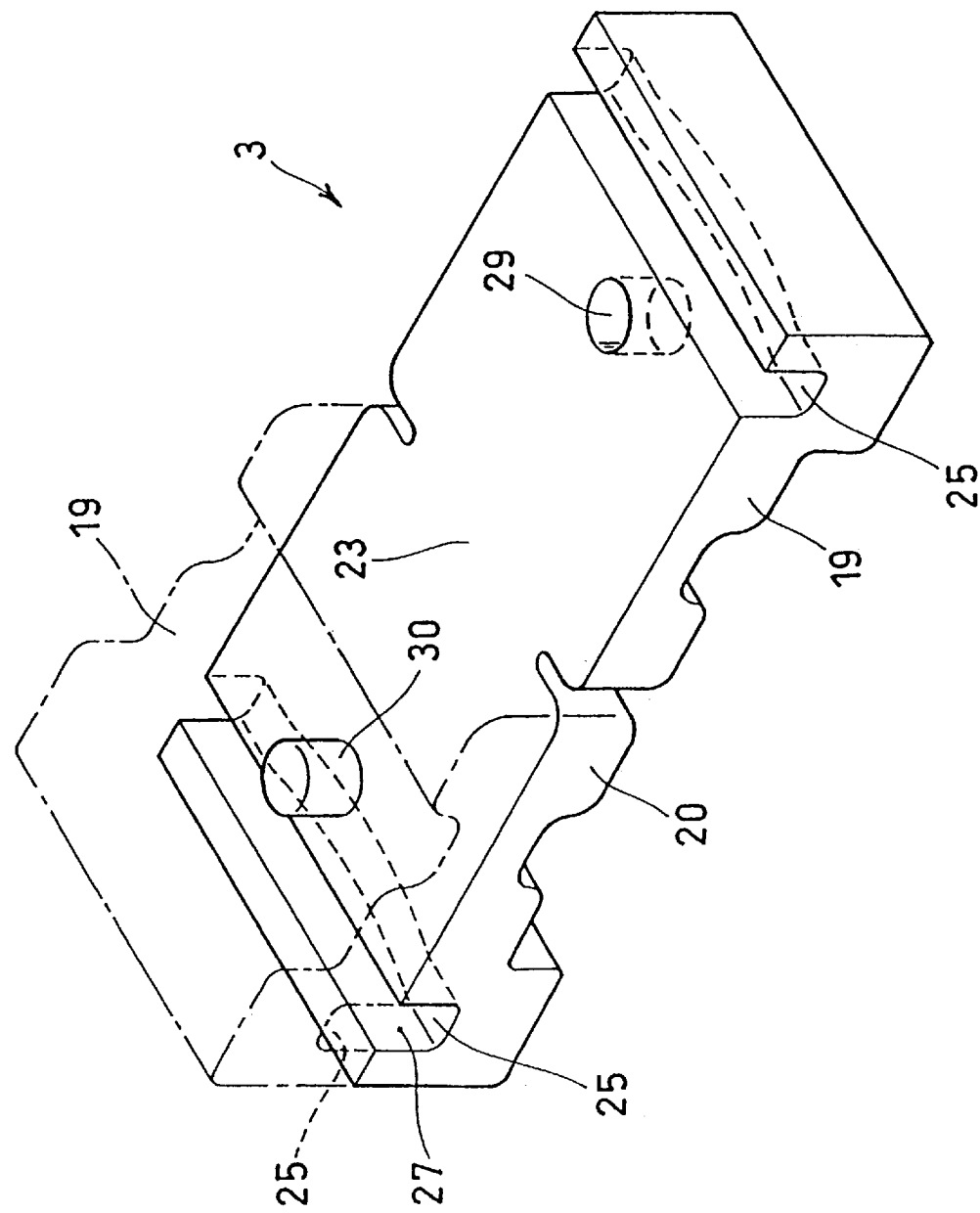
FIG. 4 is a perspective view showing the developed connection member.

As shown in FIGS. 1, 3, and 4, the connection member 3 comprises a pair of right and left rectangular mating plates 19 and 20. An end 21 of the right mating plate 19 positioned at one side thereof and an end 22 of the left mating plate 20 positioned at one side thereof are flexibly continuous with each other through a bending portion 23. A curved engaging groove 25 which engages the engaging bulged portions 10 and 10 of the supporting member 6 is formed at the other side of the inner surface of each of the mating plates 19 and 20. As shown by a one-dot chain line of FIGS. 1 and 4, the mating plates 19 and 20 are combined with each other, with the engaging grooves 25 and 25 facing each other to form an insertion hole 27 through which the supporting member 6 is inserted.

As shown in FIG. 4, an engaging projection portion 30 and an engaging concave portion 29 which can be closely engaged by the engaging projection portion 30 are formed on the inner surface of each of the mating plates 20 and 19. The engaging concave portion 29 and the engaging projection portion 30 are positioned at the center of the inner surface of each of the mating plates 19 and 20 in the direction in which the engaging groove 25 extends and a little inward from the engaging groove 25 in the direction perpendicular to the direction in which the engaging groove 25 extends. The connection member 3 is bent pivotally on the bending portion 23 in the direction in which the mating plates 19 and 20 face each other. Then, the engaging projection portion 30 is pressed into the engaging concave portion 29 to hold the mating plates 19 and 20 together as a unit, as shown by one-dot chain line of FIGS. 1 and 4.

Figure 5:
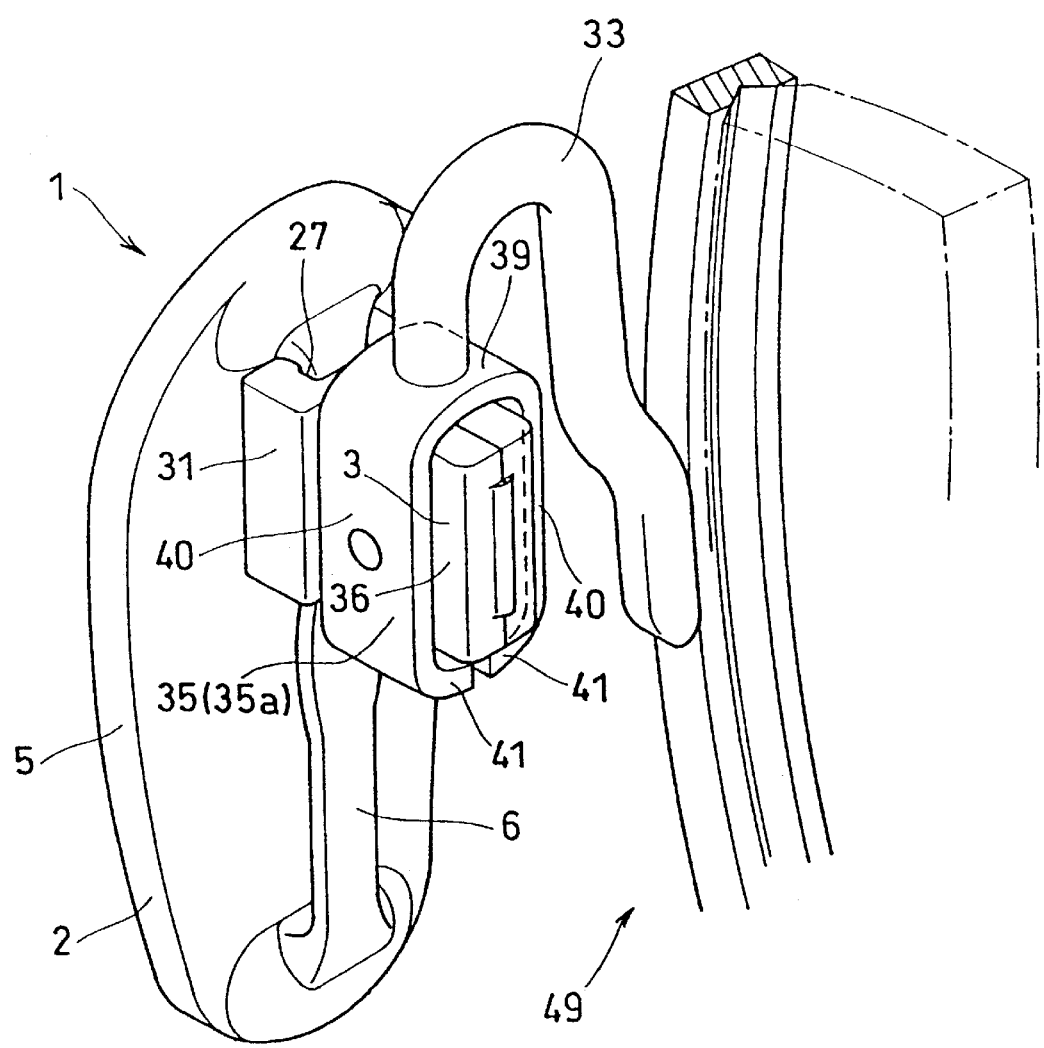
FIG. 5 is a partial perspective view showing glasses for both the far-sighted and the near-sighted on which a nose pad device is installed.

As shown in FIGS. 1 and 5, the connection member 3 thus constructed comprises an installing portion 31 installed on the supporting member 6 and a holding portion 36 connected with a surrounding frame 35a constituting a front end portion 35 of an arm 33 installed on the inner edge of a lens rim. An engaging groove 37 is formed on each side surface of the holding portion 36 such that the engaging grooves 37 confront each other.

Figure 6:
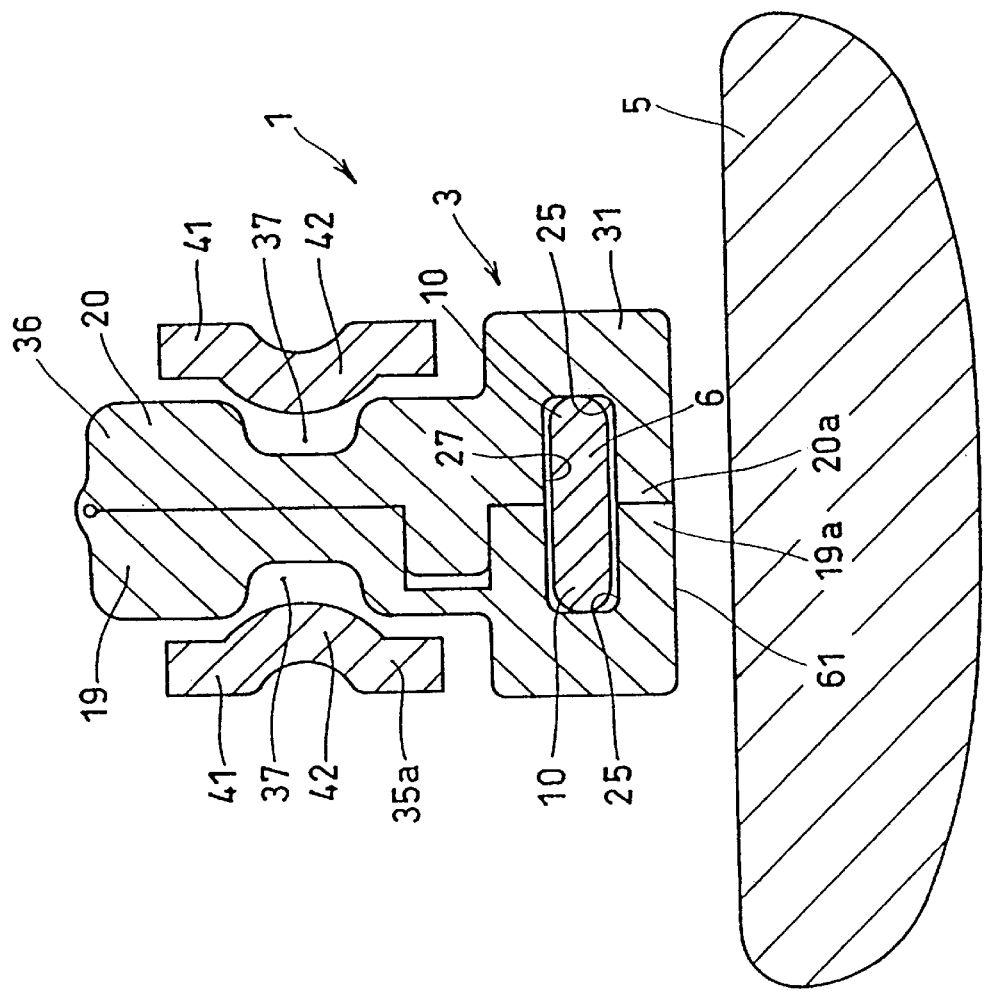
FIG. 6 is a sectional view showing the connected state of the nose pad device.

As shown in FIG. 5, the surrounding frame 35a is approximately square pillar-shaped and has side surface portions 40 and 40 continuous with a curved top surface portion 39 and extending vertically from each side of the top surface portion 39 connected with the front end of the arm 33. Bottom surface portions 41 and 41 of the surrounding frame 35a are continuous with each of the side surface portions 40 and 40 such that the bottom surface portions 41 and 41 face each other. As shown in FIG. 6, an engaging projection 42 is so formed on the inner surface of each side surface portion 40 that the engaging projection 42 bulges inward therefrom. To connect the connection member 3 with the surrounding frame 35a, each of the engaging projections 42 and 42 is fitted engagingly into each of the confronting engaging grooves 37 and 37.

Figure 7:
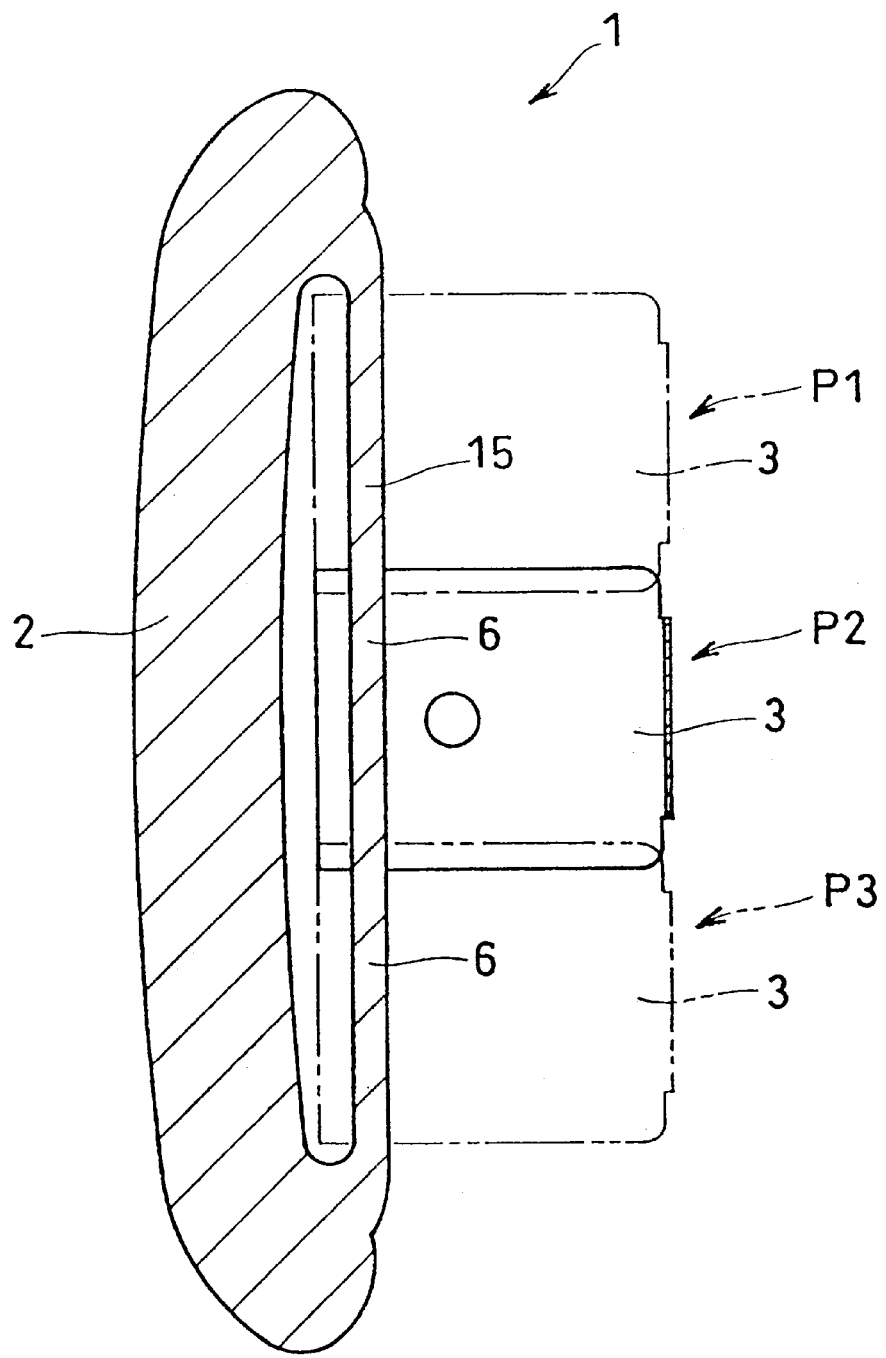
FIG. 7 is a vertical sectional view showing the sliding state of the connection member.
Figure 8:
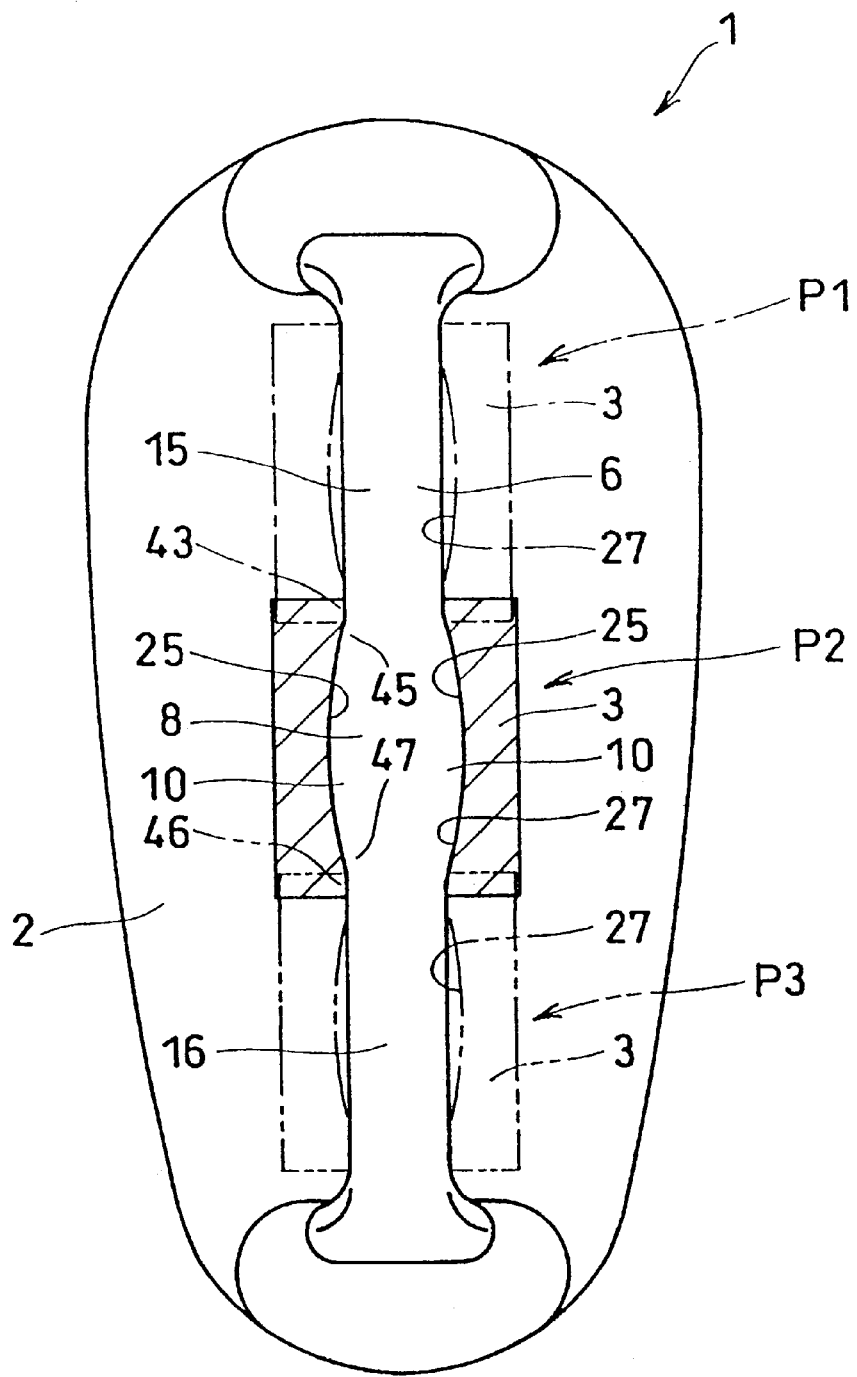
FIG. 8 is a front view showing the sliding state of the connection member.

The holding portion 36 of the connection member 3 having the above-described construction is capable of sliding vertically along the supporting member 6 inserted into the insertion hole 27. When the connection member 3 is located at the center part of the supporting member 6 in its vertical direction, as shown by a solid line of FIGS. 7 and 8, the engaging groove 25 engages the engaging bulged portion 10 of the supporting member 6, as shown in FIGS. 6 and 8. As a result, the connection member 3 is held at the center position. When the connection member 3 is located at the upper part 15 of the supporting member 6 in its vertical direction, as shown by a one-dot chain line of FIGS. 1, 7, and 8, a lower end 43 of the insertion hole 27 contacts an upper end portion 45 of the engaging bulged portion 10 engagingly. As a result, the connection member 3 is prevented from moving downward relatively to the supporting member 6. When the connection member 3 is located at the lower part 16 of the supporting member 6 in its vertical direction, as shown by a two-dot chain line of FIGS. 1, 7, and 8, an upper end 46 of the insertion hole 27 contacts a lower end portion 47 of the engaging bulged portion 10 engagingly. As a result, the connection member 3 is prevented from moving upward relatively to the supporting member 6.

In this manner, the connection member 3 is kept at the center part, the upper part, and the lower part of the supporting member 6, respectively.

Figure 9:
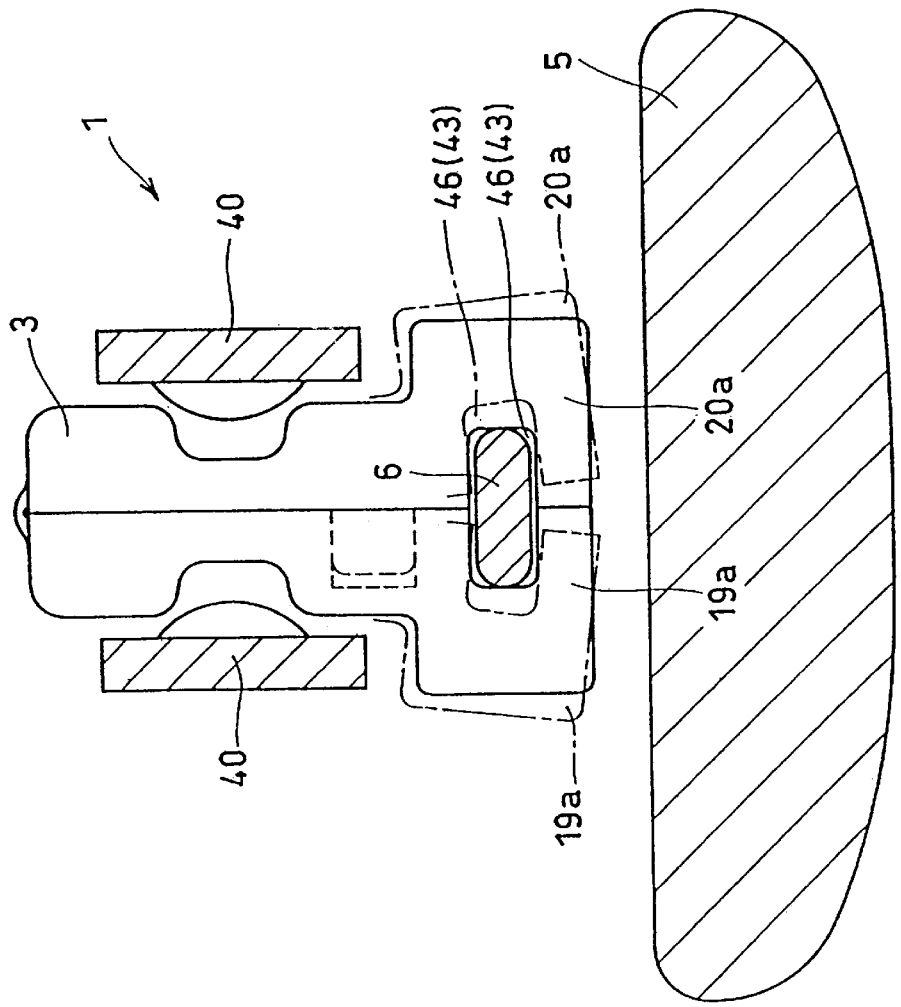
FIG. 9 is a sectional view for describing elastic expansion of the connection member in the sliding state.

The position of the connection member 3 is switched from the upper position P1 to the center position P2 and the lower position P3 (see FIGS. 1, 7, and 8) and the like by forcibly sliding the connection member 3 vertically. It is to be noted that the width of the wide center part 8 of the supporting member 6 is a little greater than that of the upper and lower ends 46 and 43 of the insertion hole 27. Thus, the connection member 3 can be forcibly slid at a comparatively weak force. For example, in sliding the connection member 3 from the center position P2 to the upper position P1 shown by the one-dot chain line, from the center position P2 to the lower position P3 shown by the two-dot chain line, or from the upper position P1 shown by the one-dot chain line to the center position P2, or from the lower position P3 shown by the two-dot chain line to the center position P2, the supporting member 6 and the mating plates 19 and 20 defining the insertion hole 27 are elastically deformed. In the first embodiment, as shown in FIG. 6, other end portions 19a and 20a of each of the mating plates 19 and 20 piled one upon another by folding the connection member 3 double at the bending portion 23 are not fixed to each other. Thus, when the upper and lower ends 46 and 43 of the insertion hole 27 pass the engaging bulged portion 10 of the supporting member 6, the other end portions 19a and 20a expand elastically. Consequently, the width of the upper end 46 of the insertion hole 27 and that of the lower end 43 thereof becomes larger from the state shown by a solid line of FIG. 9 to the state shown by a one-dot chain of FIG. 9. After the upper and lower ends 46 and 43 of the insertion hole 27 pass the engaging bulged portion 10, the other end portions 19a and 20a contract elastically. Consequently, the width of the upper end 46 of the insertion hole 27 and that of the lower end 43 thereof are elastically returned to the original one. The elastic expansion and returning or contraction allow the position change of the connection member 3 to be accomplished smoothly.

Figure 10:
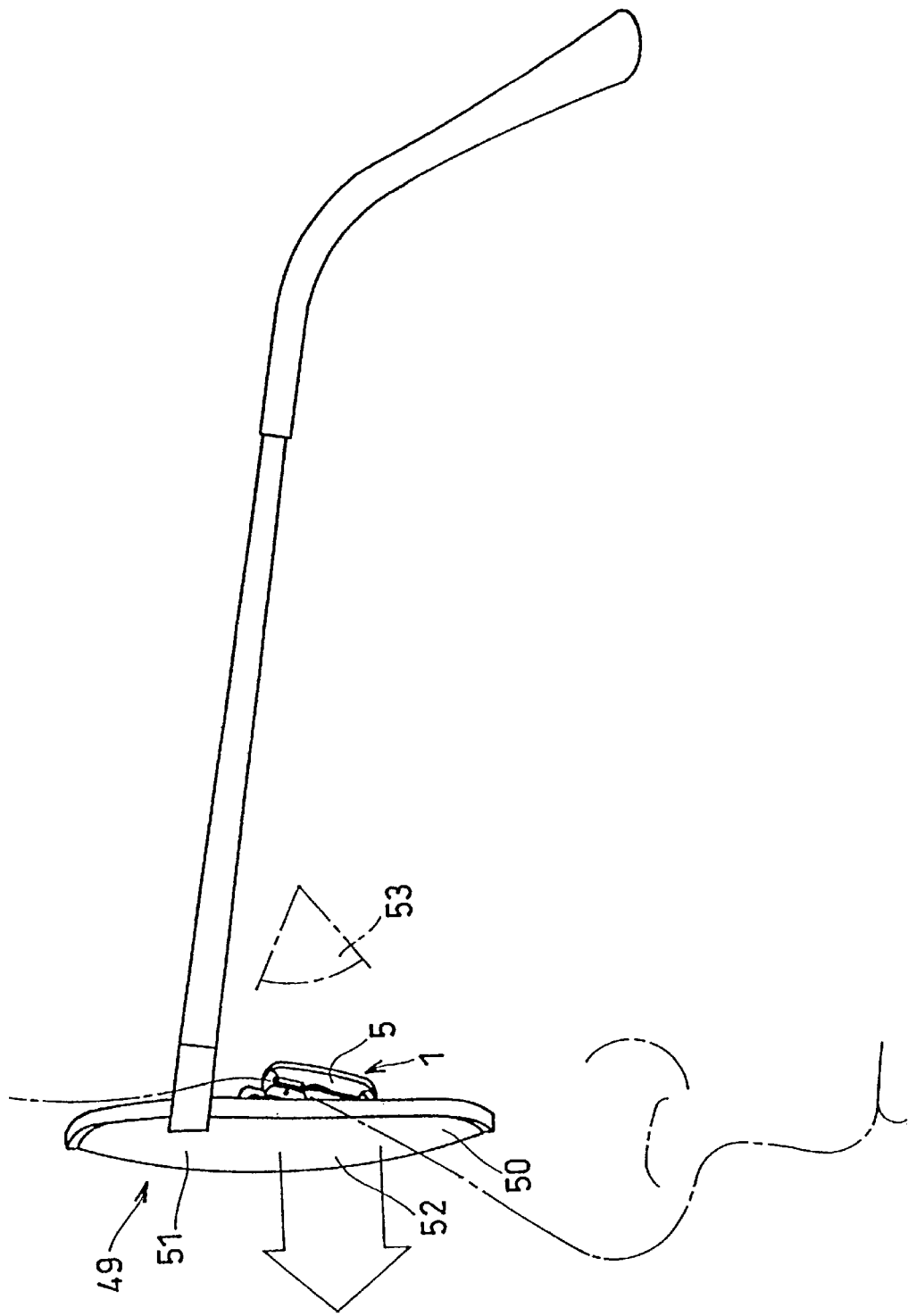
FIG. 10 is a side view showing glasses for both the far-sighted and the near-sighted used as glasses for the far-sighted.
Figure 11:
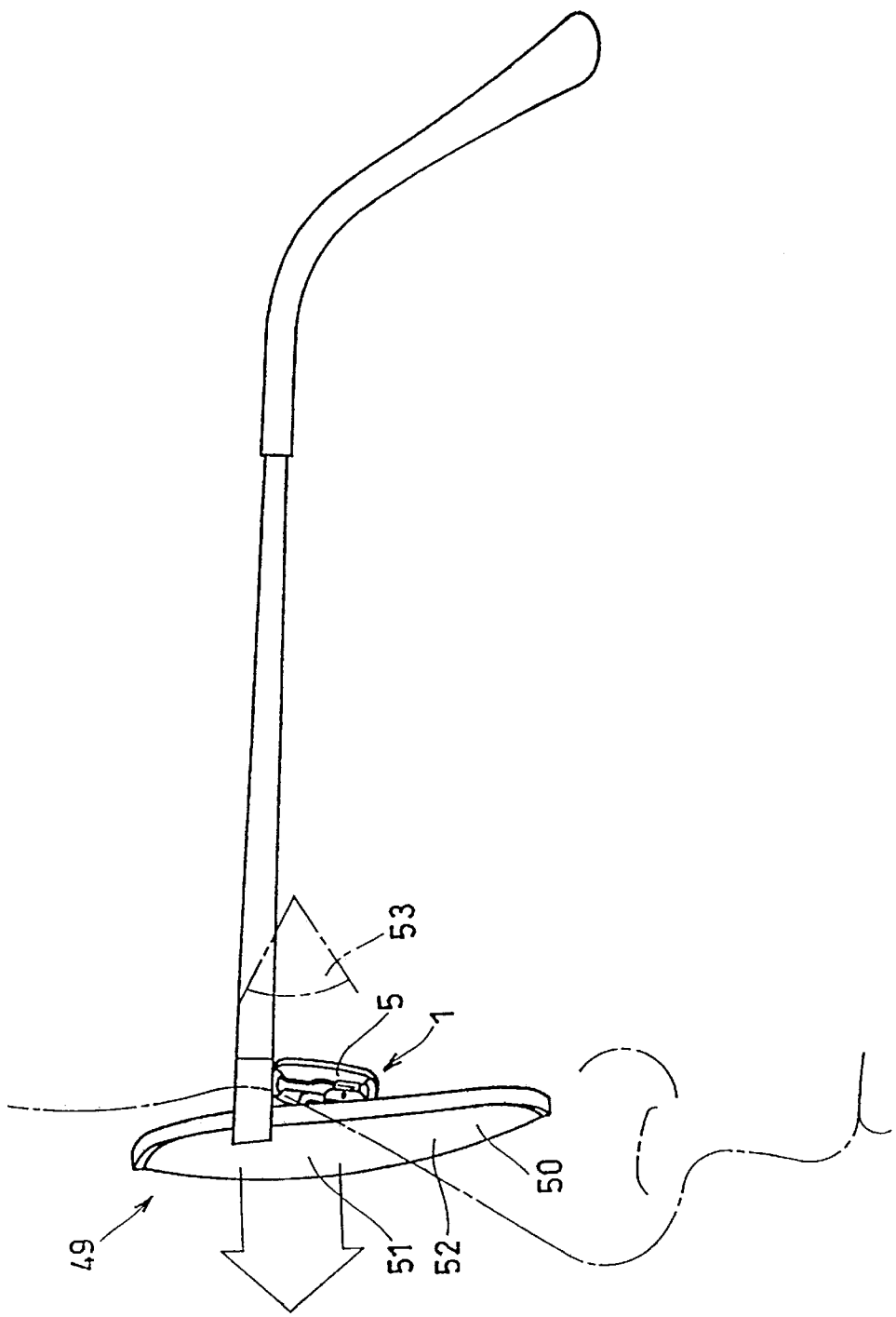
FIG. 11 is a side view showing glasses for both the far-sighted and the near-sighted used as glasses for the near-sighted.
Figure 12:
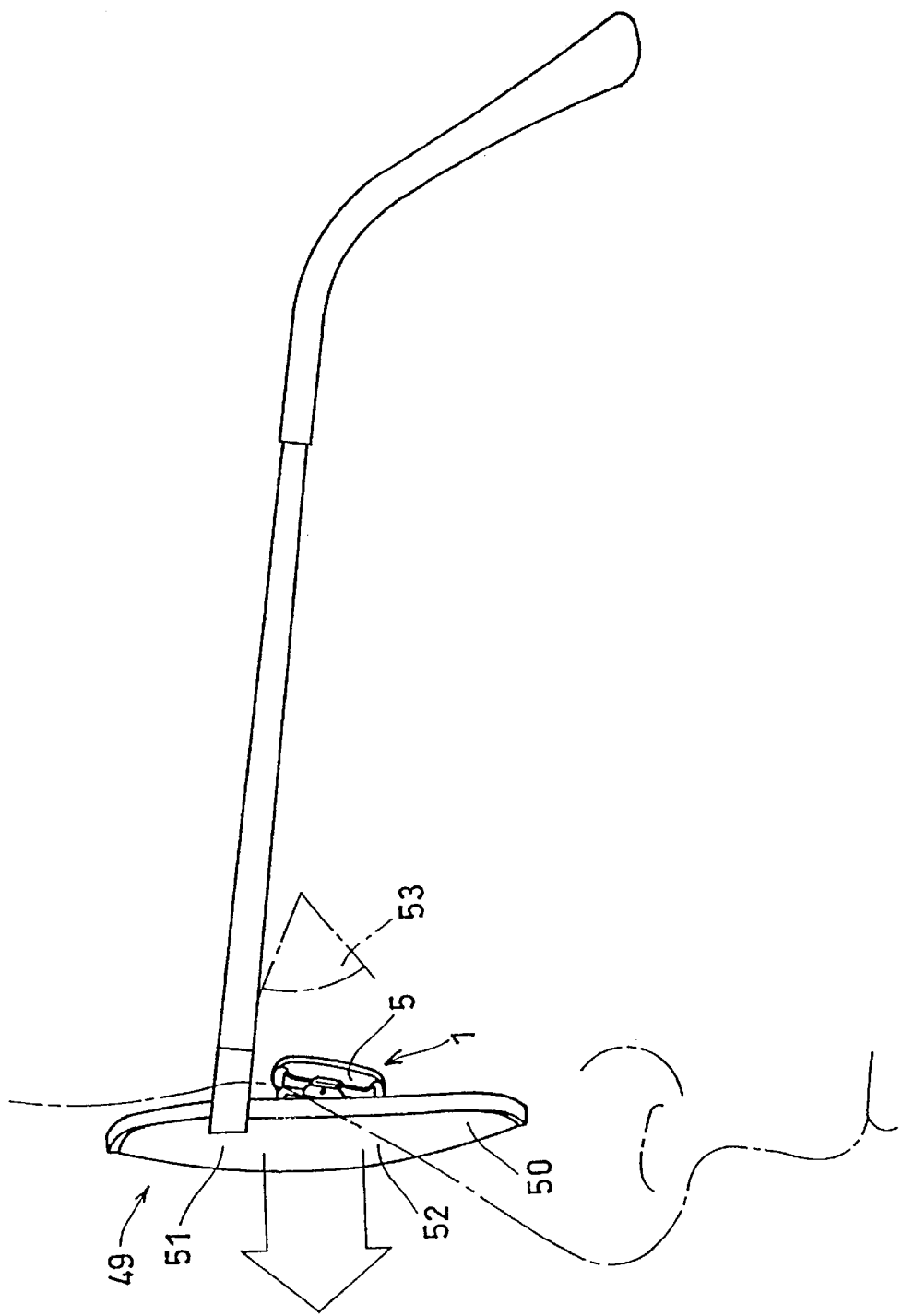
FIG. 12 is a side view showing ordinary glasses on which the nose pad device of the present invention has been installed.

FIGS. 10 through 12 show glasses 49 for both the far-sighted and the near-sighted (hereinafter referred to as merely glasses 49) put on the bridge of the nose. The glasses 49 are constituted of the nose pad device 1 having the above-described construction and connected with the surrounding frame 35a, as shown in FIG. 5. The upper part of each of the right and left lenses 50 and 50 is used as a part 51 for the near-sighted, whereas the lower part thereof is used as a part 52 for the far-sighted.

In using the glasses 49 as glasses for the far-sighted, as shown in FIG. 10, the right and left connection members 3 and 3 are set at the upper position P1 shown by one-dot chain line of FIG. 1. As a result, relatively to the position at which the pad body 5 contacts the bridge of the nose, the right and left lenses 50 and 50 are located at the upper position. Thus, the lower part (lenses 52 and 52 for the far-sighted) of each of the right and left lenses 50 and 50 is located in front of the eyes 53. Thus, as shown by an arrow of FIG. 10, a user can see an object easily through the lenses 52 and 52 for the far-sighted with the forward-facing visual axis.

In using the glasses 49 as glasses for the nearsighted, as shown in FIG. 11, the right and left connection members 3 and 3 are set at the lower position P3 (shown by two-dot chain line of FIG. 1). As a result, relatively to the position at which the pad body 5 contacts the bridge of the nose, the right and left lenses 50 and 50 are located at the lower position. Thus, the upper part (lenses 51 and 51 for the near-sighted) of each of the right and left lenses 50 and 50 is located in front of the eyes 53. Thus, as shown by an arrow of FIG. 11, a user can see an object easily through the lenses 51 and 51 for the near-sighted, with the forward-facing visual axis.

The nose pad device 1 according to the first embodiment may be used for glasses for the far-sighted, glasses for the near-sighted, and the like as well as the glasses for both the far-sighted and the near-sighted. In this case, the height of the lens with respect to the position of the nose pad is adjusted by setting the connection member 3 at the center position P2 shown by the solid line of FIG. 1. Depending on the height of the user's nose, it is possible to adjust the height of the lens by locating the connection member 3 at the upper position P1 or the lower position P3. In this case, the arm 33 (FIG. 5) is bent in an appropriate amount.

Figure 13:
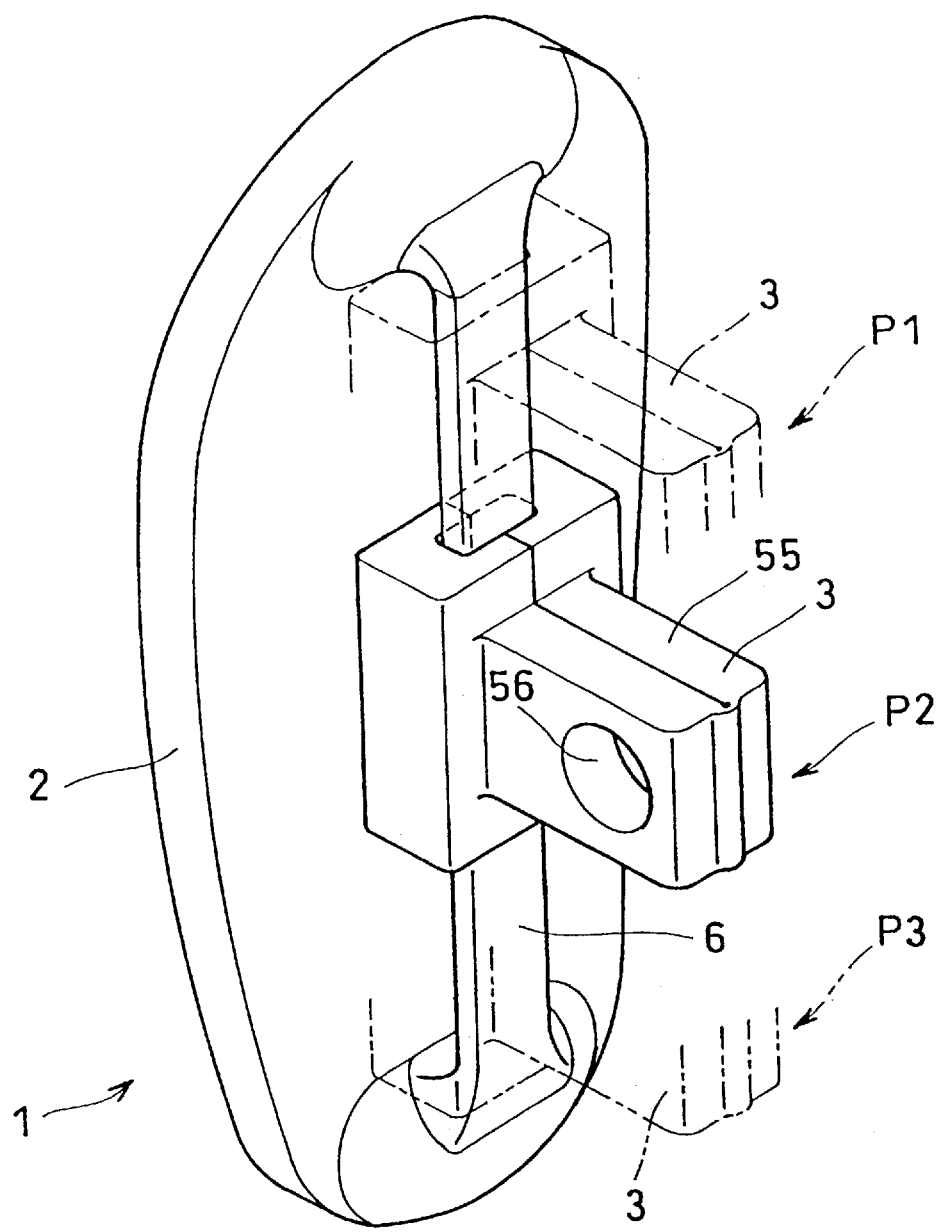
FIG. 13 is a perspective view showing a nose pad device according to another embodiment of the present invention.
Figure 14:
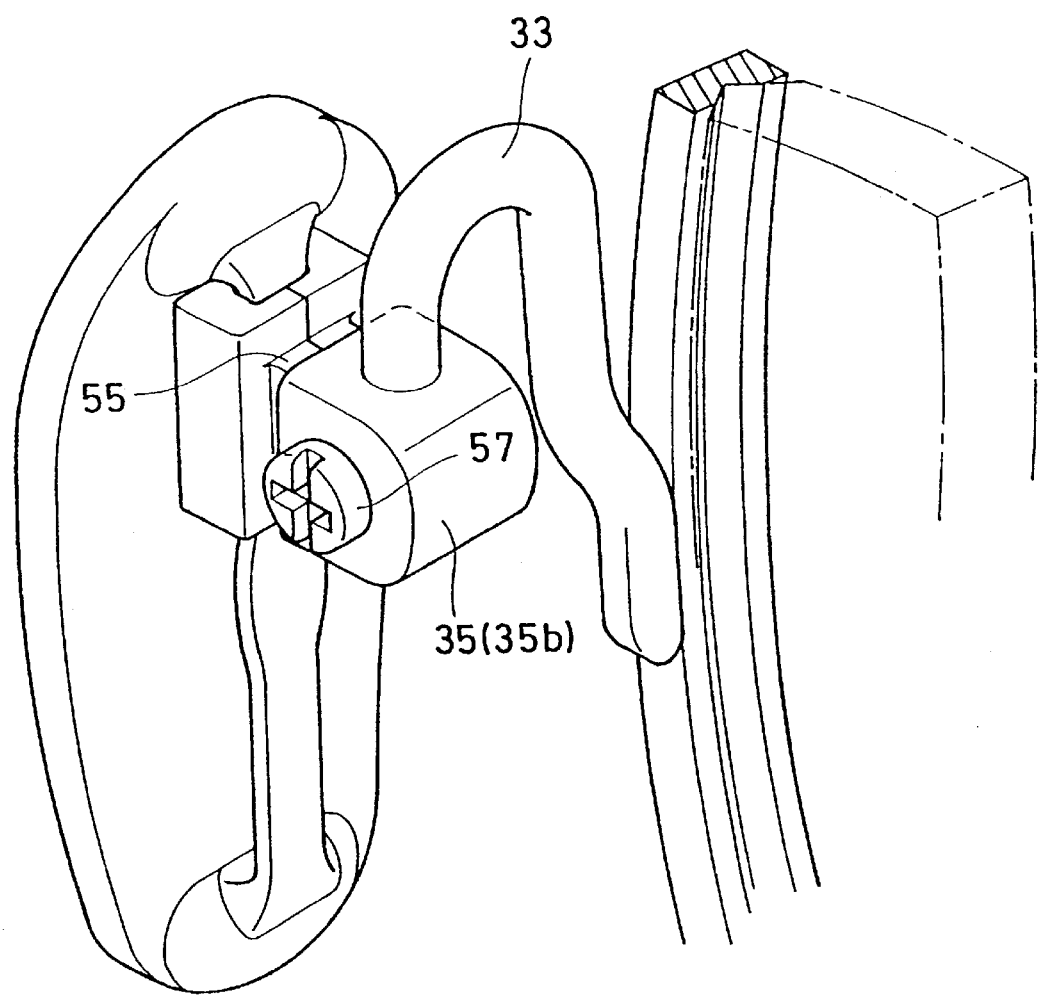
FIG. 14 is a perspective view showing the state in which the nose pad device is used.

FIGS. 13 and 14 show another embodiment of the connection member. The connection member 3 has a connection portion 55 that can be inserted into a box 35b constituting the front end portion 35 of the arm 33 soldered to the lens rim. A screw insertion hole 56 is formed inside the connection portion 55. As shown in FIG. 14, the connection portion 55 is inserted into the box 35b to connect it with the box 35b with a screw 57. The connection member 3 is capable of taking the upper position P1, the center position P2, and the lower position P3, as shown in FIG. 13.

Second Embodiment

Figure 15:
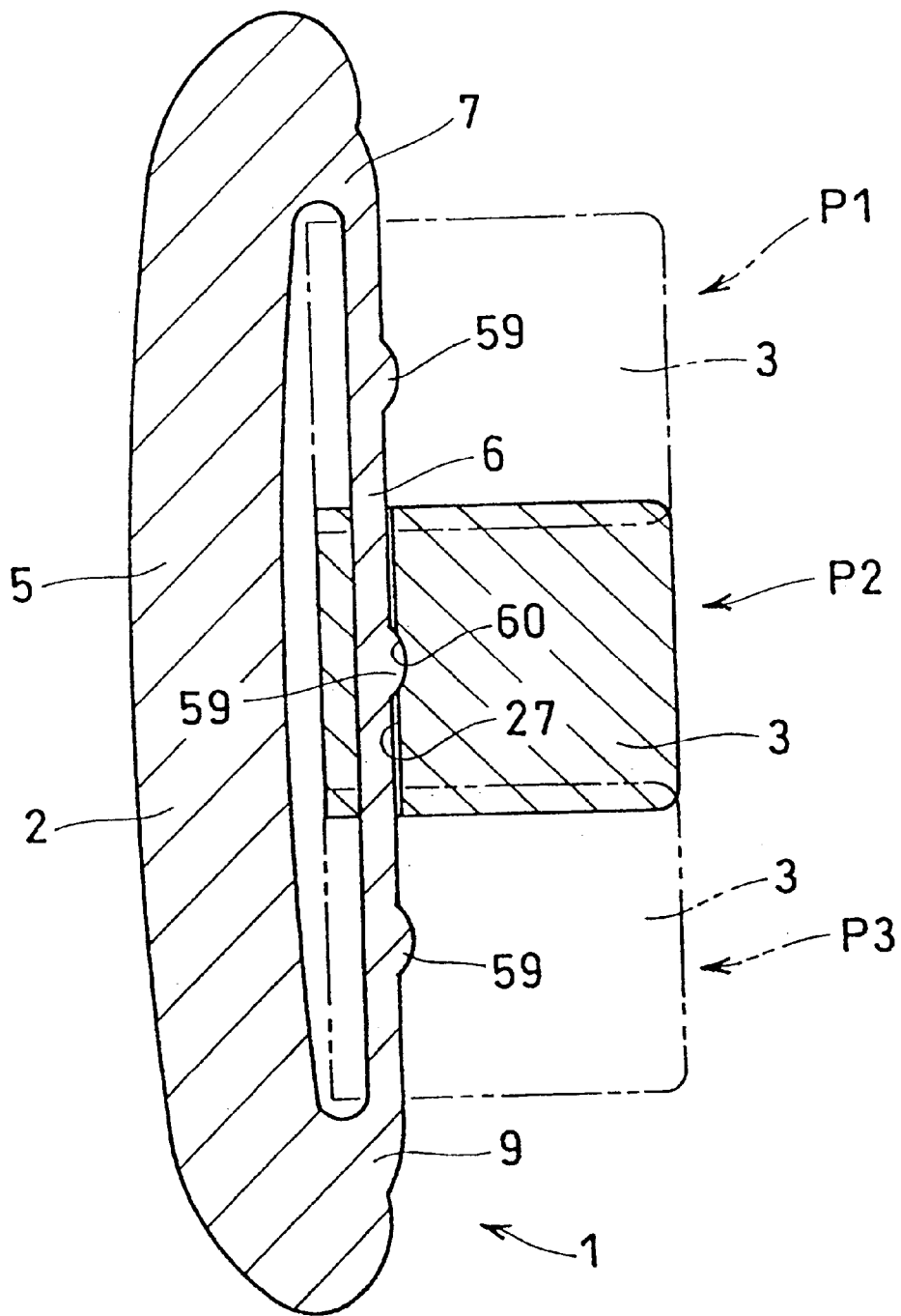
FIG. 15 is a sectional view showing a nose pad device according to a second embodiment of the present invention.
Figure 16:
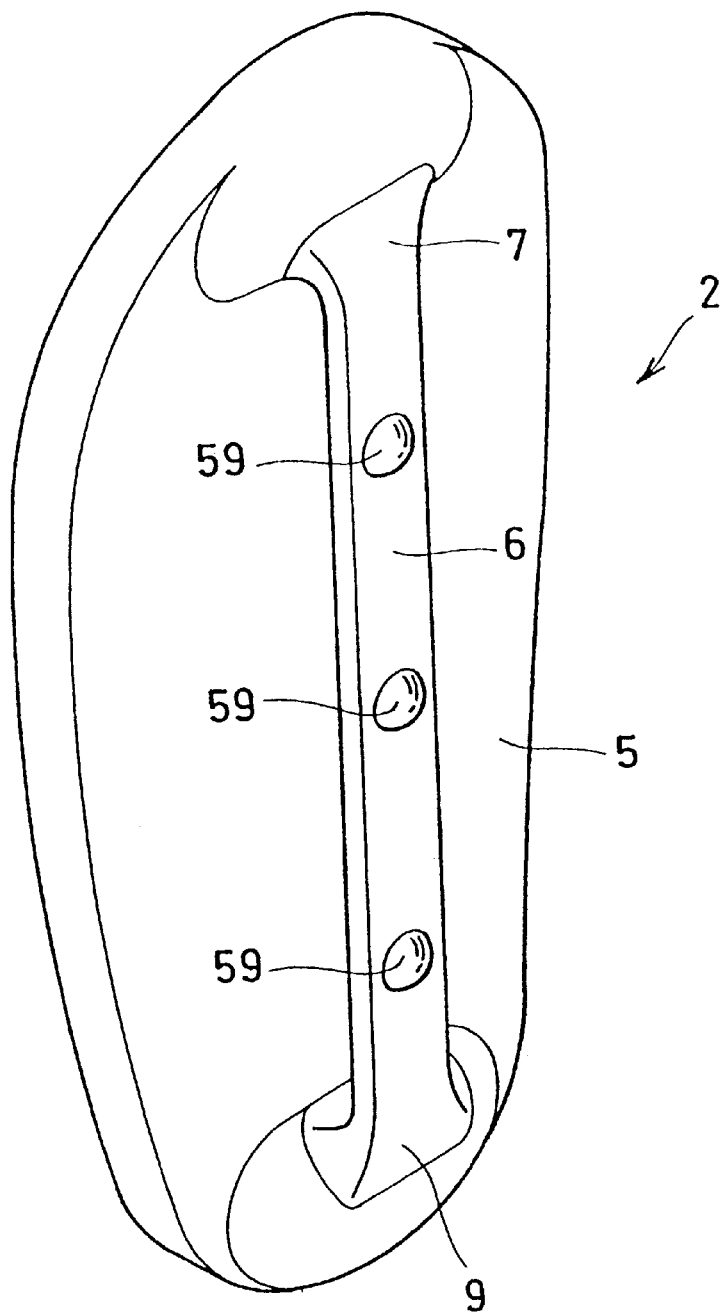
FIG. 16 is a perspective view showing a nose pad for use in the nose pad device.

FIG. 15 shows the nose pad device 1 according to the second embodiment of the present invention. As shown in FIG. 16, the nose pad 2 is made of synthetic resin such as nylon shaped by one-piece molding. The upper and lower ends 7 and 9 of the substantially straight supporting member 6 extending vertically and having the same width throughout its length are connected with each of upper and lower portions of the rear surface of the pad body 5 which contacts the bridge of the nose.

Three spherical engaging projection portions 59 are formed at upper, central, and lower positions of the supporting member 6 in its vertical direction.

Unlike the first embodiment in which the connection member 3 has the engaging groove 37 formed thereon, the connection member 3 of the second embodiment has an engaging concave portion 60 engaging the engaging projection portions 59 and formed on a part of the surface of the mating plate defining the insertion hole 27. The engaging concave portion 60 engages any one of the engaging projection portions 59, depending on the position of the connection member 3, thus holding the connection member 3 at the center position P2, the upper position P1, and the lower position P3.

The operation of the glasses for both the far-sighted and the near-sighted comprising the nose pad device 1 having the above-described construction is similar to that of the nose pad device of the first embodiment.

Other Embodiments

①   The nose pad device of the present invention may be so composed that it is not stably held at the center position and held at the upper position and the lower position. For example, the engaging bulged portion of the first embodiment is set small or the engaging projection portion of the second embodiment is formed at only the upper portion and the lower portion of the supporting member.

②   It is preferable to compose the connection member of the mating plates by combining them with each other. But it is possible to compose the connection member of a member provided that the member has an insertion hole through which the supporting member can be inserted to slide the member vertically along the supporting member.

③ The means for holding the connection member at the upper, lower, and center positions may have various constructions provided that the means has an engaging bulged portion at both sides of the supporting member or only at one side thereof, similarly to the first embodiment or has an engaging projection portion, similarly to the second embodiment.

④ If the pad body is transparent, displays such as characters or figures may be formed on a surface 61 (FIGS. 1 and 6) of the connection member confronting the rear surface of the pad body to allow a user to see them through the pad body at each of the upper, lower, and center positions of the connection member.

⑤ The engaging projection portion of the second embodiment may be formed on the connection member and the engaging concave portion may be formed on the supporting member.

⑥ In composing the connection member of a pair of mating plates, it is possible that one end of each of the mating plates is not flexibly connected with each other but they may have constructions different from each other.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

As described above, the present invention has the following superior effects:

① The nose pad device of the present invention has the connection member slidable vertically along the supporting member provided rearward from the rear side of the pad body.

Thus, when the nose pad device having the construction is installed on glasses for both the farsighted and the near-sighted, the lens can be located at its upper position with respect to the nose by positioning the connection member at its upper position. Thus, a user can see an object through the lower part of the lens with the natural forward-facing visual axis, thus using the glasses as glasses for the far-sighted with ease.

The lens can be located at its lower position with respect to the nose by positioning the connection member at its lower position. Thus, a user can see an object through the upper part of the lens with the natural forward-facing visual axis, thus using the glasses as glasses for the near-sighted with ease.

The present invention provides the effect of seeing an object with natural visual axis by merely adjusting the vertical position of the connection member on the nose pad.

Figure 17:
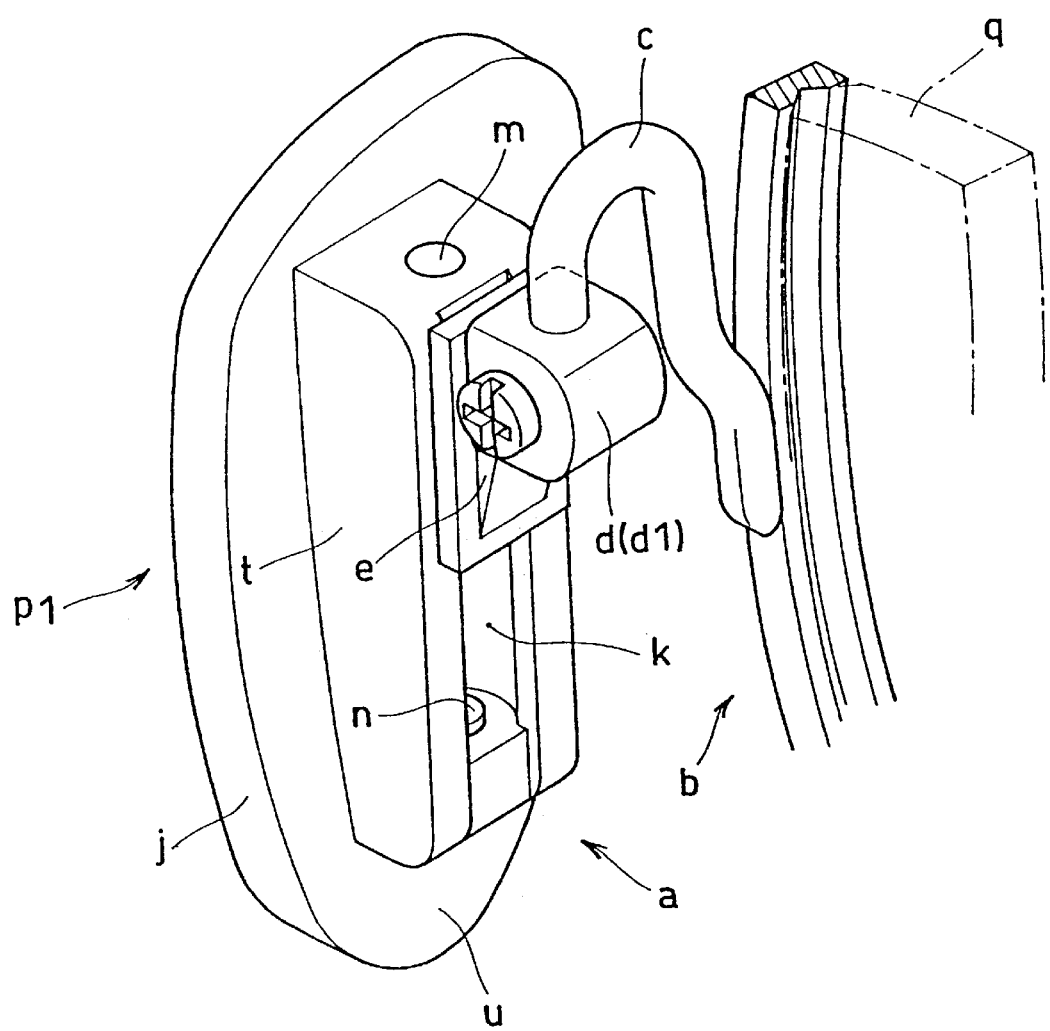
FIG. 17 is a perspective view showing a conventional nose pad device.
Figure 18:
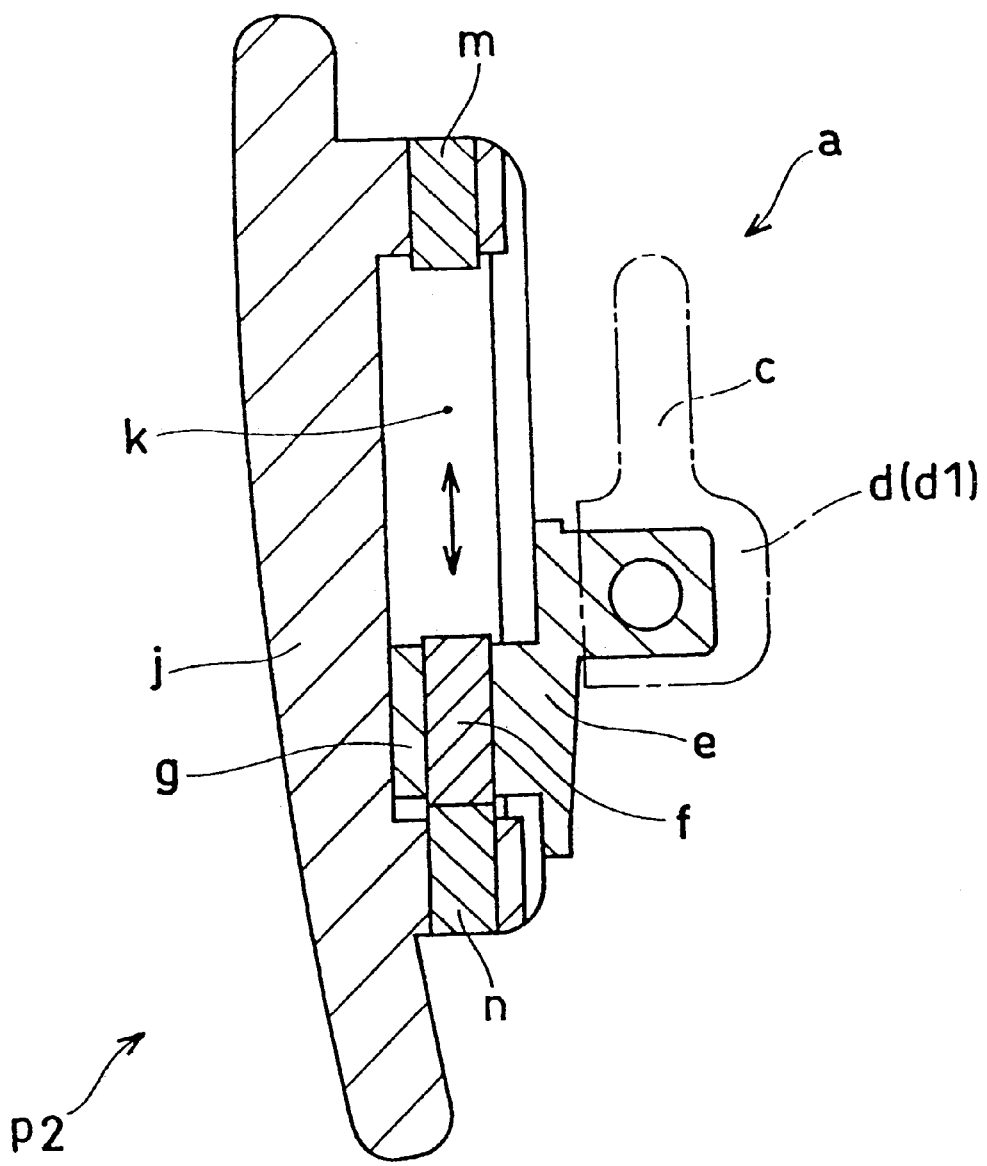
FIG. 18 is a sectional view showing the nose pad device.
Figure 19:
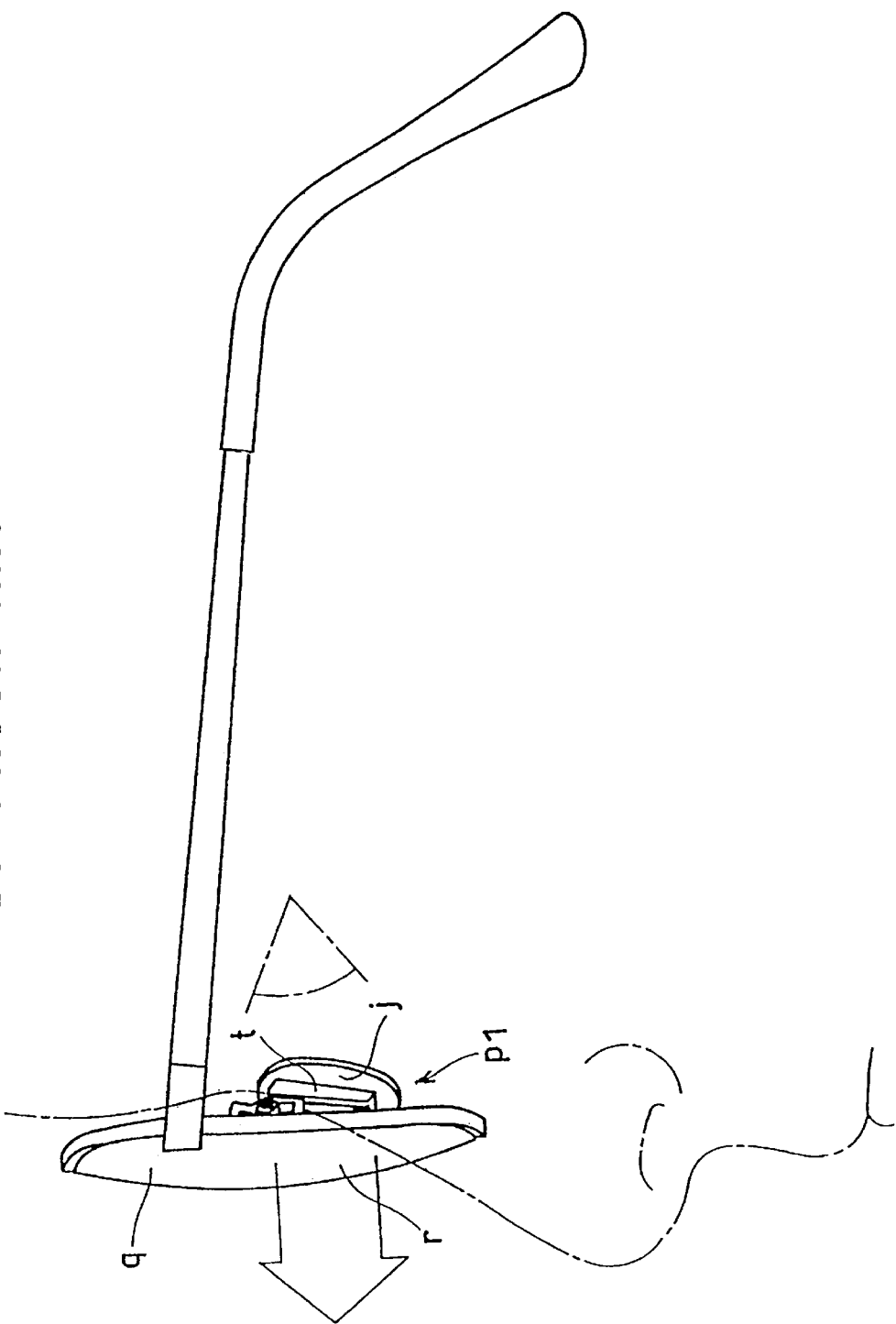
FIG. 19 is a side view showing the state in which glasses for both the far-sighted and the near-sighted on which a conventional nose pad device has been installed is used as glasses for the far-sighted.
Figure 20:
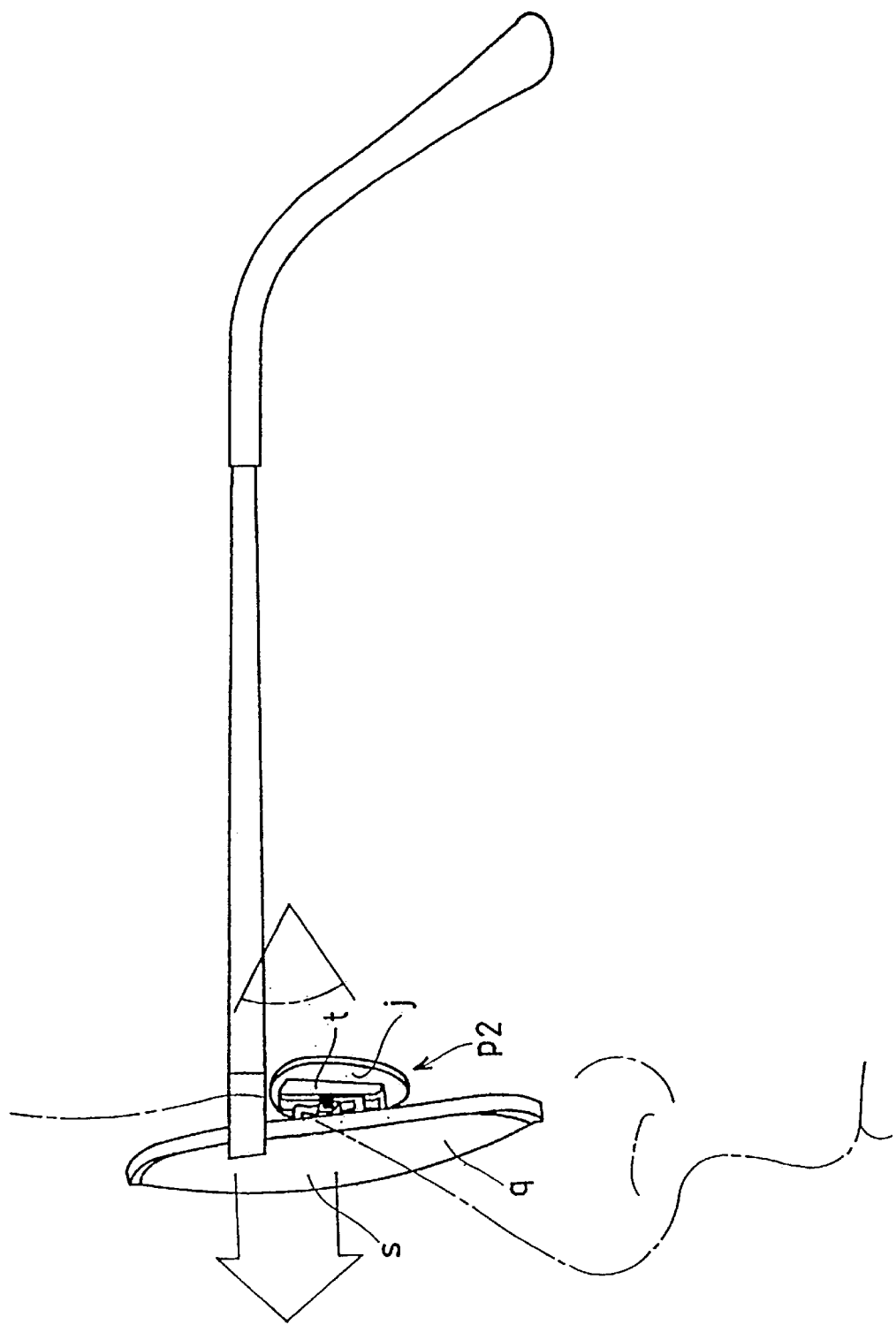
FIG. 20 is a side view showing the state in which glasses for both the far-sighted and the near-sighted on which the conventional nose pad device has been installed is used as glasses for the near-sighted.
Figure 21:
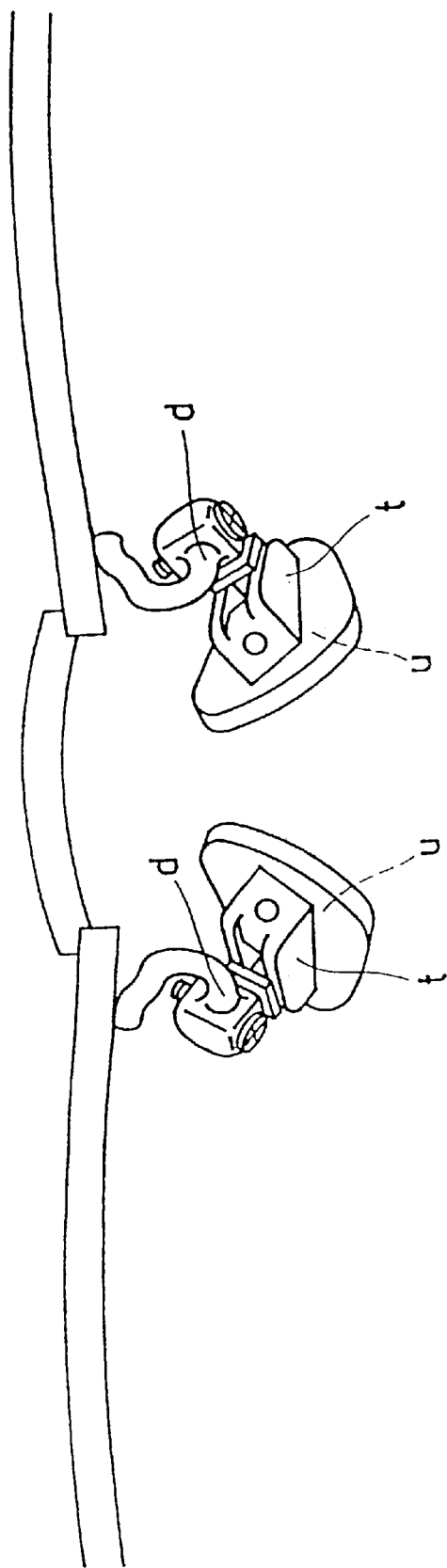
FIG. 21 is a plan view showing the glasses for both the far-sighted and the near-sighted on which a conventional nose pad device has been installed.

② The desired position of the connection member can be selected by sliding the connection member vertically along the supporting member. Further, the connection member can be held at the upper and lower positions by the engagement between the engaging portion formed on the supporting member and the engaging portion formed on the connection member. In the conventional nose pad device having a magnet for adjusting the height of the lens, disadvantageously, the unattractive groove-forming projection (t) (FIG. 17) vertically projects from the rear surface of the nose pad. Thus, the nose pad of the present invention has appearance similar to that of the conventional one. Further, because the distance between the rear surface of the nose pad and the front end of the arm can be set short, the nose pad of the present invention allows the correction of eyesight to be accomplished accurately, similarly to the ordinary nose pad.

③ The position of the connection member on the supporting member can be set to two stages, namely, the upper and lower positions or three stages, namely, the upper, center, and lower positions. Thus, the connection member at the right side and that at the left side can be aligned with each other easily and reliably.

In particular, the nose pad device of the present invention can be utilized as glasses for the far-sighted or glasses for the near-sighted and the like, by allowing the connection member to be held at the center position. Depending on the height of the nose of a user, it is possible to adjust the height of the lens with respect to the nose by locating the connection member at its upper position or the lower position. That is, the connection member allows the height of the lens to be adjusted accurately, according to a user.

④ The supporting member is connected with the upper and lower portions of the rear surface of the pad body, with the intermediate part of the supporting member not in contact with the rear surface of the pad body so that the connection member does not contact the rear surface of the pad body when it slides vertically along the supporting member. Thus, the operation of sliding the connection member can be accomplished smoothly and further, the pad body is prevented from being damaged by the connection member. Accordingly, the rear surface of the pad body is prevented from looking unattractive.

⑤ The engaging bulged portion formed on both side edges of the center part of the supporting member in its vertical direction has the edge gently curved in the shape of a circular arc. The upper and lower end of the engaging bulged portion is continuous with each of the edge of the upper part of the supporting member and the edge of the lower part thereof through an edge curved concavely in the shape of a circular arc. The engaging groove which engages the circular arc-shaped concave engaging bulged portion of the supporting member is formed on a part of the inner surface (upper surface in FIG. 4) of the connection member defining the insertion hole. Thus, the operation of sliding the connection member vertically can be accomplished smoothly.

Further, the engaging bulged portion of the supporting member and the upper and lower parts thereof are continuous with each other through the edge curved concavely in the shape of a circular-arc. Therefore, it is possible to prevent the connected portion thereof from being cracked. That is, the supporting member has a high degree of strength.

⑥ The connection member is composed of a pair of the mating plates combined with each other, and the insertion hole is formed of a pair of the engaging grooves combined with each other, as described above. Therefore, the width of each of the upper and lower portions of the insertion hole in its vertical direction expands elastically, when the upper and lower portions of the insertion hole pass the engaging bulged portion of the supporting member 6. After the upper and lower portions of the insertion hole pass the engaging bulged portion, the width of each of the upper and the lower end parts of the insertion hole is elastically returned to the original length. The elastic expansion and contraction allow the position change of the connection member 3 to be accomplished smoothly. That is, an excess force is not applied to the connection member and the supporting member. Thus, the operation of sliding the connection member vertically can be accomplished smoothly.

What is claimed is:

1. A nose pad device for glasses comprising:

a nose pad having a supporting member provided rearward from a rear surface of a pad body contacting the bridge of the nose, with upper and lower ends of said supporting member connected with each of upper and lower positions of said rear surface of said pad body and having an engaging bulged portion formed on said supporting member on both side edges or one side edge of a center part thereof in a vertical direction thereof; and a connection member having an insertion hole through which said supporting member is inserted and sliding vertically along said supporting member, wherein when said connection member is located at said center part of said supporting member, a surface defining said insertion hole engages said engaging bulged portion so as to keep said connection member at said center part of said supporting member;

when said connection member is located at an upper part of said supporting member, a lower end of said insertion hole contacts and engages an upper portion of said engaging bulged portion so as to prevent said connection member from moving downward relative to said supporting member; and when said connection member is located at a lower part of said supporting member, an upper end of said insertion hole contacts and engages a lower portion of said engaging bulged portion so as to prevent said connection member from moving upward relative to said supporting member.

2. A nose pad device for glasses according to claim 1, wherein an end of each of mating plates at one side thereof is flexibly continuous with each other to form said connection member; and an engaging groove engaging said engaging bulged portion of said supporting member is formed at the other side of an inner surface of each of said mating plates so that an insertion hole through which said supporting member is inserted is formed of said engaging grooves by combining said mating plates with each other, with said insertion grooves facing each other.

3. A nose pad device for glasses according to claim 2, wherein a width of each of said upper and lower ends of said insertion hole expand elastically when said upper and lower ends pass said engaging bulged portion and is restored elastically after said upper and lower ends pass therethrough.

4. A nose pad device for glasses comprising:

a nose pad having a supporting member provided rearward from a rear surface of a pad body contacting the bridge of the nose, with upper and lower ends of said supporting member connected with each of upper and lower positions of said rear surface of said pad body and having an engaging projection portion formed on said supporting member at a center part, an upper part, and a lower part thereof in a lengthwise direction thereof; and a connection member having an insertion hole through which said supporting member is inserted and sliding vertically along said supporting member, wherein when said connection member is located at said center part of said supporting member, an engaging concave portion formed on a surface defining said insertion hole engages said engaging projection portion formed at said center part so as to keep the connection member at said center part of said supporting member;

when said connection member is located at said upper part of said supporting member, said engaging concave portion engages said engaging projection portion formed at said upper part so as to keep the connection member at said upper part of said supporting member; and when said connection member is located at said lower part of said supporting member, said engaging concave portion engages said engaging projection portion formed at said lower part so as to keep the connection member at said lower part of said supporting member.

5. A nose pad device for glasses comprising:

a nose pad having a supporting member provided rearward from a rear surface of a pad body contacting the bridge of the nose, with upper and lower ends of said supporting member connected with each of upper and lower positions of said rear surface of said pad body and having an engaging bulged portion formed on said supporting member on both side edges or one side edge of a center part thereof in a vertical direction thereof; and a connection member having an insertion hole through which said supporting member is inserted and sliding vertically along said supporting member, wherein when said connection member is located at an upper part of said supporting member, a lower end of said insertion hole contacts and engages an upper portion of said engaging bulged portion so as to prevent said connection member from moving downward relative to said supporting member; and when said connection member is located at a lower part of said supporting member, an upper end of said insertion hole contacts and engages a lower portion of said engaging bulged portion so as to prevent said connection member from moving upward relative to said supporting member.

6. A nose pad device for glasses comprising:

a nose pad having a supporting member provided rearward from a rear surface of a pad body contacting the bridge of the nose, with upper and lower ends of said supporting member connected with each of upper and lower positions of said rear surface of said pad body and having an engaging projection portion formed on said supporting member at an upper part and a lower part thereof in a lengthwise direction thereof; and a connection member having an insertion hole through which said supporting member is inserted and sliding vertically along said supporting member, wherein when said connection member is located at said upper part of said supporting member, said engaging concave portion formed on a surface defining said insertion hole engages said engaging projection portion formed at said upper part so as to keep the connection member at said upper part of said supporting member; and when said connection member is located at said lower part of said supporting member, said engaging concave portion engages said engaging projection portion formed at said lower part so as to keep the connection member at said lower part of said supporting member.

7. A nose pad device for glasses according to any one of claims 1 through 6, wherein said connection member does not contact said rear surface of said pad body when said connection member slides vertically.

8. A nose pad device for glasses according to claim 7, wherein said pad body is transparent, and displays such as characters or figures are formed on a surface, of said connection member, confronting said rear surface of said pad body.

9. A nose pad device for glasses according to any one of claims 1, 2, 3, and 5, wherein said engaging bulged portion has an edge gently curved in the shape of a circular arc, and both ends of said engaging bulged portion is continuous with each of an edge of an upper part of said supporting member and an edge of a lower part thereof through an edge curved concavely in the shape of a circular arc.

10. A nose pad device for glasses according to claim 9, wherein said pad body is transparent, and displays such as characters or figures are formed on a surface, of said connection member, confronting said rear surface of said pad body.

11. A nose pad device for glasses according to any one of claims 1 through 6, wherein said pad body is transparent, and displays such as characters or figures are formed on a surface, of said connection member, confronting said rear surface of said pad body.

* * * * *